United States Patent
Komatsu et al.

(10) Patent No.: US 7,515,157 B2
(45) Date of Patent: Apr. 7, 2009

(54) DATA TRANSMISSION DEVICE, DATA TRANSFER SYSTEM AND METHOD

(75) Inventors: Toyohiko Komatsu, Kawasaki (JP); Hideki Osaka, Kawasaki (JP); Masashi Horiguchi, Kodaira (JP); Susumu Hatano, Kodaira (JP); Kazuya Ito, Kodaira (JP)

(73) Assignee: Elpida Memory, Inc., Tokyo (JP)

( * ) Notice: Subject to any disclaimer, the term of this patent is extended or adjusted under 35 U.S.C. 154(b) by 1202 days.

(21) Appl. No.: 10/333,132

(22) PCT Filed: Dec. 14, 2000

(86) PCT No.: PCT/JP00/08848

§ 371 (c)(1),
(2), (4) Date: May 14, 2003

(87) PCT Pub. No.: WO02/09376

PCT Pub. Date: Jan. 31, 2002

(65) Prior Publication Data

US 2003/0189984 A1  Oct. 9, 2003

(30) Foreign Application Priority Data

Jul. 25, 2000  (JP)  ............... 2000-223472

(51) Int. Cl.
*G06F 13/14* (2006.01)

(52) U.S. Cl. .............. 345/519; 345/520; 345/537; 710/20; 710/305; 710/313

(58) Field of Classification Search ........... 375/257, 375/259; 379/398, 399.01; 345/204, 519, 345/520, 537; 710/20, 106, 305, 313; 398/135, 398/138; 714/43
See application file for complete search history.

(56) References Cited

U.S. PATENT DOCUMENTS

| | | | |
|---|---|---|---|
| 4,388,725 A | | 6/1983 | Saito et al. |
| 4,959,833 A | * | 9/1990 | Mercola et al. ............ 714/748 |
| 4,973,955 A | * | 11/1990 | Avaneas ..................... 370/221 |
| 5,802,390 A | * | 9/1998 | Kashiwagi et al. ............ 710/1 |
| 6,772,269 B1 | * | 8/2004 | Kaganoi ....................... 710/1 |

FOREIGN PATENT DOCUMENTS

JP  56-76654  6/1981

(Continued)

OTHER PUBLICATIONS

"Stub Series Terminated Logic for 3.3 Volts (SSTL-3)", EIAJ ED-5512, enacted Mar. 1986.

*Primary Examiner*—Abbas I Abdulselam
(74) *Attorney, Agent, or Firm*—Mattingly, Stanger, Malur & Brundidge, PC

(57) ABSTRACT

A data transfer method is executed to transit a three-state transmitting circuit from a high-impedance state into a data output state, transmit a preamble (dummy data) onto a bus, and sequentially transmit the essential data. The shortening of a waveform caused in the first data piece after the transition from the high-impedance state into the data output state is executed against the preamble and no shortening of a waveform is not brought about in the essential data subsequent to the preamble. This makes it possible to exclude the limitation on speeding up the data transfer imposed by the shortening of the waveform.

4 Claims, 18 Drawing Sheets

FOREIGN PATENT DOCUMENTS

| | | |
|---|---|---|
| JP | 63-125029 | 5/1988 |
| JP | 1-189224 | 7/1989 |
| JP | 3-136119 | 6/1991 |
| JP | 04-298996 | 10/1992 |
| JP | 4-307834 | 10/1992 |
| JP | 07-141079 | 6/1995 |
| JP | 7-141079 | 6/1995 |
| JP | 10-51292 | 2/1998 |
| JP | 10-133794 | 5/1998 |
| JP | 2000-132290 | 5/2000 |

* cited by examiner

DATA TRANSMISSION DEVICE, DATA TRANSFER SYSTEM AND METHOD

TECHNICAL FIELD

The present invention relates to a technology of transferring data, and more particularly to the technology of improving the efficiency of transferring the data.

BACKGROUND ART

As a technology of transferring data among a plurality of modules, there has been known a bus system that has been used for, for example, data transfer inside of a computer system. The bus system has been arranged so that a plurality of modules are connected through a common bus, in which the bus is used as a data transmission path among the modules in a time-divisional manner for the purpose of transferring the data. This type of bus is normally composed of address signal lines, data signal lines, a control signal lines, and clock signal lines.

As a layout of connecting the bus with the modules in the bus system, there has been known a layout of connecting each module with the bus directly or through a resistor or another layout of connecting each module with the bus in a noncontact manner with a crosstalk. The layout of connecting each module with the bus through the resistor is described in the STTL (Stub Series Terminated Logic, EIAJ ED-5512 (http://www.jeita.or.jp)). The layout of connecting each module with the bus in a noncontact manner with a crosstalk is described in JP-A-2000-132290.

Herein, FIG. 14 shows a typical arrangement of the bus system having a layout of directly connecting each module with the bus.

With reference to FIG. 14, numerals 811 and 812 denote modules to which a bus line 800 that is a data bus is connected. The modules 811 and 812 provide three-state transmitting circuits (or three-state buffers) 821 and 832 whose output terminals are connected to the bus line 800 and receiving circuits 831 and 822 whose input terminals are connected to the bus line 800, respectively.

The three-state transmitting circuits 821 and 832 are allowed to be controlled to keep each output to either one of a high-impedance state and a data output state (or level determined state). In the data output state, the output of the three-state transmitting circuits 821 and 832 is made to be any one of the state where the "L" level is outputted and the state where the "H" level is outputted according to the data value to be transferred.

In such an arrangement, in a case that the data is transferred from one module 811 to another module 812, at first, the operation is executed to make the transmitting circuits of all the modules connected to the bus line 800 be in the high-impedance state. Then, only the three-state transmitting circuit 821 of the module 811 is made to be in the data output state so that the data may be outputted to the bus line 800. Then, the data outputted onto the bus line 800 is received in the receiving circuit 822 of the module 812 and then is sent to the inside of the module 812.

In turn, FIG. 15 shows a typical arrangement of the bus system having a layout of connecting each module with the bus in a noncontact manner with a crosstalk.

With reference to FIG. 15, numerals 1011 and 1012 denote modules. The module 1011 is directly connected to a bus line 1000 served as a data bus, while the module 1012 is connected to the bus line not directly but through a directional coupler 1001. Numeral 1002 denotes a stub line for connecting the directional coupler 1001 with the module 1012. Herein, the arrangement including the bus line 1000, the coupler 1001 and the stub line 1002 is called a noncontact bus.

The modules 1011 and 1012 provide three-state transmitting circuits 1021 and 1032 and receiving circuits with hysteresis characteristic 1031 and 1022, respectively. In the module 1011, the output terminal of the three-state transmitting circuit 1021 and the input terminal of the receiving circuit with hysteresis characteristic 1031 are connected to the bus line 1000. In the module 1012, the output terminal of the transmitting circuit 1032 and the input terminal of the receiving circuit 1022 are connected to the stub line 1002.

In such an arrangement, for example, in a case that data is transferred from one module 1011 to another module 1012, at first, an operation is executed to make the transmitting circuits of all the modules connected to the bus line 100 be in a high-impedance state. Then, only the three-state transmitting circuit 1021 inside of the module 1011 is made to be in the data output state so that the data may be outputted onto the bus line 1000. The data outputted onto the bus line 1000 is transformed into a differential pulse caused by a crosstalk in the directional coupler 1001. This differential pulse is received in the receiving circuit with hysteresis characteristic 1022 inside of the module 1012 through the stub wire 1002. Then, the hysteresis characteristic of the receiving circuit 1022 causes this differential signal to be decoded into the same signal as the output signal of the transmitting circuit 1021. The decoded signal is sent into the inside of the module 1012.

The aforementioned bus system has difficulty in speeding up a data transfer cycle (bus period).

At first, FIG. 16 shows a timing chart appearing in the case of consecutively transferring four pieces of data from the module 811 to the module 812 in the bus system (that has a layout of directly connecting each module with the bus) shown in FIG. 14.

In this case, as shown in FIG. 16(a), on the bus line 800, a transition time tr1 from the high impedance state where no data is outputted to the determination of the first data piece is made longer that the transition time tr2 from the output end of the one previous data piece to the termination of each data later than the first data piece. This is because in the three-state transmitting circuit 821 of the module 811 the waveform appearing in the transition from the high impedance state to the data output state is duller than the waveform appearing in the transition from the "L" level output state to the "H" level output state or the "H" level output state to the "L" level output state.

As shown in FIG. 16(b), as to the delay time from the time when the receiving circuit 822 of the module 812 receives the switching signal of the data to the determination of the output data of the receiving circuit 822, the delay time td1 for the first data piece is made longer than the delay time td2 for the second or later data piece. This is because a difference takes place between the delay times tr1 and tr2 and the delay time is characterized to be longer as the waveform transition time of the input signal of the receiving circuit 822 is made longer as shown in FIG. 17.

As set forth above, in the bus system having a layout of directly connecting each module with the bus, the pulse width tw1 of the first data piece to be outputted to the inside of the module by the receiving circuit of the module itself is made shorter than the pulse width tw2 of the second or later data piece. This phenomenon becomes an obstacle to speeding up the data transfer cycle (bus period).

Next, FIG. 18 shows a timing chart appearing in the case of consecutively transferring four data pieces from the module 1011 to the module 1012 in the bus system shown in FIG. 15 (that has a layout of connecting each module with the bus not directly but with a crosstalk).

In this case, as shown in FIG. 18(b), the differential pulse 1101 for the first data piece, received by the receiving circuit with hysteresis characteristic 1022, is made about half as long as the differential pulse 1102 for the second or later data piece.

This is because as to the second or later data piece the differential pulse is caused according to a relatively great change from the "L" level to the "H" level or "H" level to the "L" level, while as to the first data piece the differential pulse is caused according to the relatively small change from the middle level of the "H" level and the "L" level to the "H" level or the "L" level. Before the first data piece, that is, in the state that no module outputs the data, the level of the bus line 1000 is normally made to be the middle level between the "H" level and the "L" level through the use of the termination resistor.

As described above, in the bus system that has a layout of connecting each module with the bus not directly but with the crosstalk, the differential pulse for the first data piece is made smaller than the differential pulse for the second or later data piece. In order to properly receive the differential pulse for the first data piece, the sensitivity of the receiving circuit with hysteresis characteristic may be enhanced. However, the enhanced sensitivity leads to disability of securing a sufficient noise margin for the noise caused in speeding up the data transfer cycle (bus period). This disability becomes an obstacle to speeding up the data transfer cycle (bus period).

DISCLOSURE OF INVENTION

The present invention is made in consideration of the foregoing circumstances, and it is an object of the present invention to realize more efficient data transfer.

In carrying out the object, the present invention is arranged to sequentially transfer a plurality of data pieces through the use of a switchable transmitting means for selectively switching the output state into either one of the high-impedance state and the data output state. Further, the invention includes output control means for controlling an output of the transmitting means, the output control means serving to switch the output state of the transmitting means from the high-impedance state into the data output state and, a given time later, sequentially enter a plurality of data pieces into the transmitting means. This allows the output control means to control the transmitting means so that the data may be sequentially transmitted from the transmitting means.

Herein, the data means information to be transferred, such as a command or an address used in a computer.

According to an aspect of the invention, after the bus state is transited from the high-impedance state into the data output state, until a given period of time is passed, no first data is allowed to be transmitted. During this period when no data is transmitted, a dummy data (preamble) signal that has a "H" level value or an "L" level value is caused to transmit. This may prevent the waveform of the first data piece to be transmitted after the dummy data from being reduced in length or the differential pulse for the data piece from being reduced in size. Hence, these limitations to speeding up the data transfer speed may be excluded.

BEST MODE FOR CARRYING OUT THE INVENTION

Hereafter, the description will be oriented to each embodiment of the invention to be applied to the bus system.

Figure 1:
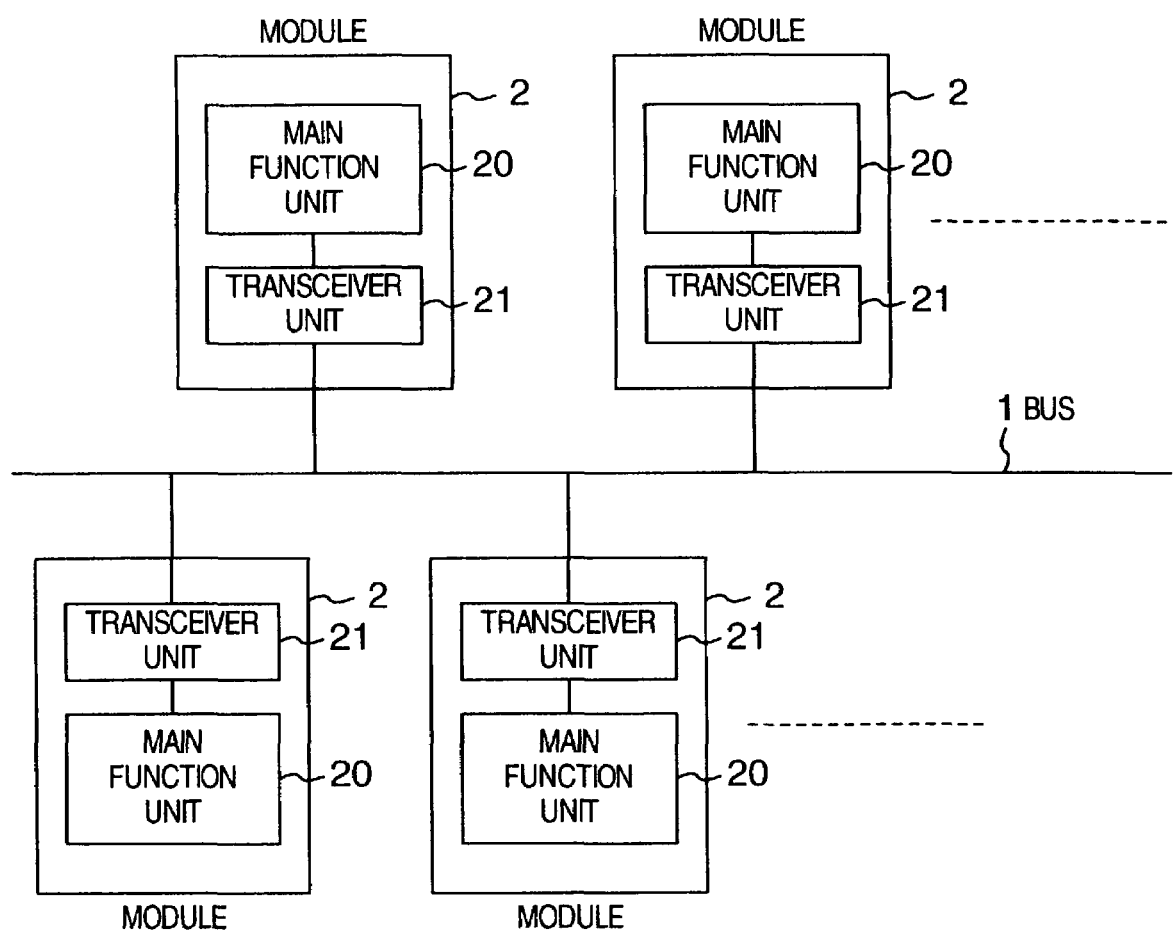
FIG. 1 is a block diagram schematically showing a bus system to which the first embodiment of the invention is applied.

FIG. 1 shows a schematic arrangement of the bus system to which a first embodiment of the invention is applied.

With reference to FIG. 1, in the bus system of this embodiment, each module 2 is connected to a bus 1 through which data is transferred between the modules. Each module 2 may be a semiconductor integrated circuit such as an LSI or a memory chip. The bus 1 includes a data bus and a command bus. Each module 2 includes a main function unit 20 for performing a main function of the module 2 and a transceiver unit 21 for arbitrating an I/O of data between the main function unit 20 and the bus 1.

Figure 2:
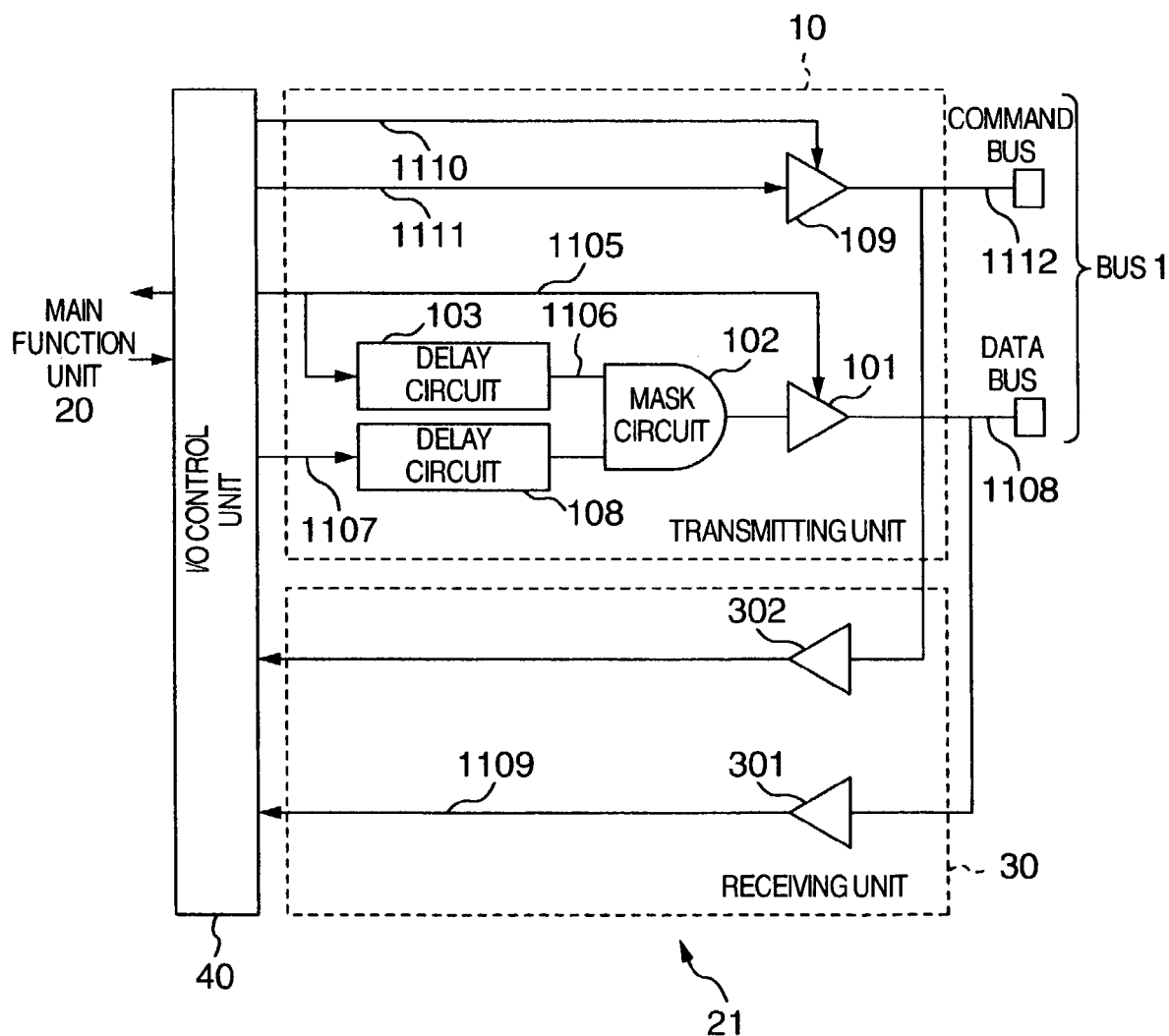
FIG. 2 is a block diagram schematically showing an arrangement of a transceiver unit 21 shown in FIG. 1.

FIG. 2 shows a schematic arrangement of the transceiver unit 21.

As shown in FIG. 2, the transceiver 21 includes an I/O control unit 40, a transmitting unit 10 and a receiving unit 30. The transmitting unit 10 includes three-state transmitting circuits 101 and 109, delaying circuits 103 and 108 and a mask circuit (gate) 102. The receiving unit 30 includes receiving circuits 301 and 302. For clarifying the description, herein, the data bus 1108 is shown to have a one-bit width. It is to be understood that the data bus 1108 may have parallel bits.

Hereafter, the operation of the transceiver unit 21 will be described with an example of the case that a write command and the data to be written through the write command are transferred from one module 2 to another module 2. The timing chart of a signal to be received and transmitted by the transceiver unit 21 is shown in FIG. 3.

At first, the description will be oriented to the operation of the transceiver unit 21 included in the module 2 on the transmitting side.

Figure 3:
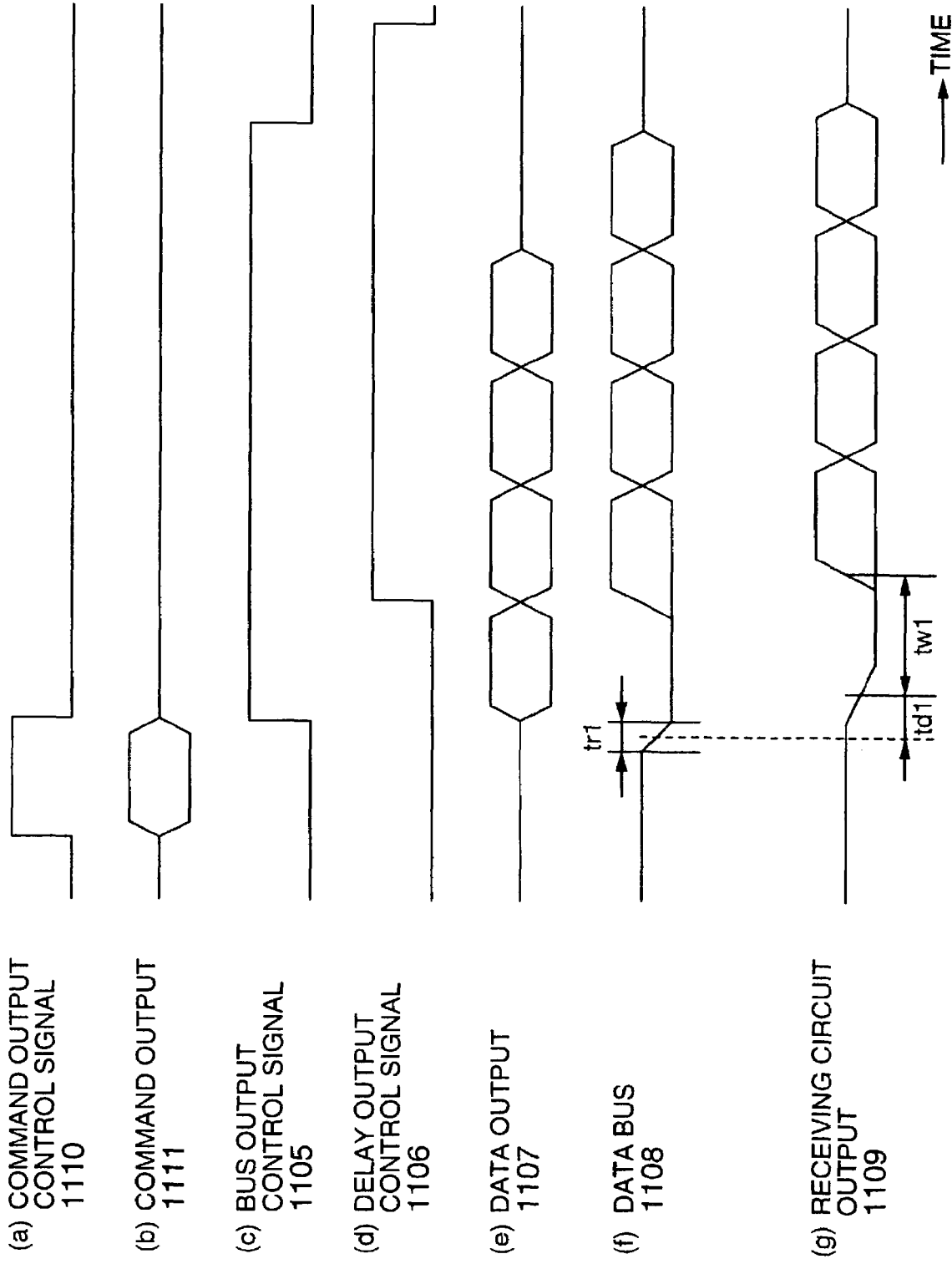
FIG. 3 is a chart showing each timing of signals to be transmitted or received by the transceiver unit 21 shown in FIG. 2.

As shown in FIG. 3, when a request for transmitting the data is issued from the main function unit 20 to the bus 1, the I/O control unit 40 executes the cycle of asserting a command output control signal 1110 (see FIG. 3(a)) and outputting a command 1111 (see FIG. 3(b)) and then the cycle of outputting data 1107. These cycles are executed in sequence (see FIG. 3(e)). Further, the output control signal 1105 is made to be at the "H" level (see FIG. 3(c)) in the cycle of outputting the data 1107 and one cycle immediately after the cycle of having outputted the last data piece 1107.

The transmitting unit 20 causes the three-state transmitting circuit 109 to be in the output state when the command output control signal 1110 is asserted at the "H" level in the cycle of outputting the command 1111, in which output state the command 1111 is outputted onto the command bus 1112 of the bus 1.

After the cycle later than the cycle at which the command 1111 is outputted, the bus output control signal 1105 is asserted at the "H" level and thereby causes the three-state transmitting circuit 101 to be in the output state (see FIG. 3(c)). At this time, the mask circuit 102 is served to output the "L" level signal because the delay output control signal 1106 earlier by one cycle corresponding time (Tm), delayed by the delaying circuit 103, is at the "L" level. Then, this "L" level signal is outputted from the three-state transmitting circuit 101 onto the data bus 1108 of the bus 1. Herein, the mask circuit 102 is an AND circuit having a gate function which is served to fix the output to the "L" level when one of two inputs is at the "L" level or set the output to the same level as the other input level while the other of two inputs is at the "H" level.

In the cycle next to the cycle in which the bus output control signal 1105 is asserted to be the "H" level, the mask circuit 102 is served to output the first data piece 1107 delayed one cycle by the delaying circuit 108 because the delay output control signal 1106 earlier by one cycle, delayed by the delaying circuit 103, is at the "H" level. Then, the first data piece 1107 is outputted to the data bus 1108 of the bus 1 through the three-state transmitting circuit 101. In the later cycles, similarly, each data piece 1107 is outputted from the mask circuit 102 to the data bus 1108 of the bus 1 through the three-state transmitting circuit 101.

When the output of all the data pieces 1107 (four in the example shown in FIG. 3) to the data bus 1108 of the bus is terminated, the output control signal 1105 is returned to the "L" level, by which the three-state transmitting circuit 101 is returned to the high-impedance state.

As a result, after the "L" level signal is outputted as shown in FIG. 3(f), the essential data pieces 1107 are outputted onto the data bus 1108 of the bus 1 in sequence. That is, on the data sequence the head of which contains the "L" level signal is outputted on the data bus 1108. Later, herein, the period of the "L" level signal added at the head of the data sequence is called a preamble.

In turn, the description will be oriented to the operation of the transceiver unit 21 included in the module 2 on the receiving side.

The command received from the command bus 1112 of the bus 1 by the receiving circuit 302 is transmitted to the input control unit 40. As the output 1109 of the receiving circuit 301, the data received from the data bus 1108 of the bus by the receiving circuit 301 is outputted to the I/O control unit 40. The data piece in the cycle two later than the cycle in which the command was received is transmitted as valid data to the main function unit 20. This allows only the essential data excluding the preamble to be passed to the main function unit 20. In other words, the invalid data whose level is determined in one cycle immediately after the command is discarded.

In this embodiment, as shown in FIG. 3(g), the pulse width tw1 of the output data caused by increasing the delay time td1 in the receiving circuit 301 resulting from the transition time tr1 taking place about the first received data piece is reduced against the preamble. That is, the reduction of the pulse width tw1 does not take place with regard to the essential data. Hence, the data transfer period may be reduced accordingly and the data transfer may be made more efficient.

This embodiment has been described with an example of the case that the write command and the data to be written by the write command are transferred from one module 2 to another module 2. Instead, in a case that the command issuing unit is matched to the data transfer destination, that is, in a case that a read command is issued from one module 2 to another module 2 and data is transferred from the latter module 2 to the former module 2, the I/O control unit 40 included in the transceiver unit 21 of the module 2 on the receiving side serves to transmit the data in the cycle two later than the cycle in which the subject module 2 issued the command as valid data to the main function unit 20.

In this embodiment, though the preamble is the signal fixed at the "L" level, this may be the signal fixed at the "H" level. Or, it may be a signal fixed at either the "H" level or the "L" level. Further, the period of the preamble is made to be the same as the data transfer cycle. However, both may be different from each other.

Next, the description will be oriented to the second embodiment of the invention.

In this embodiment, on the bus system of the first embodiment shown in FIG. 1, the data transfer is executed through the use of a strobe signal. In this case, the bus 1 is composed to have a strobe signal bus in addition to the data bus and the command bus.

Figure 4:
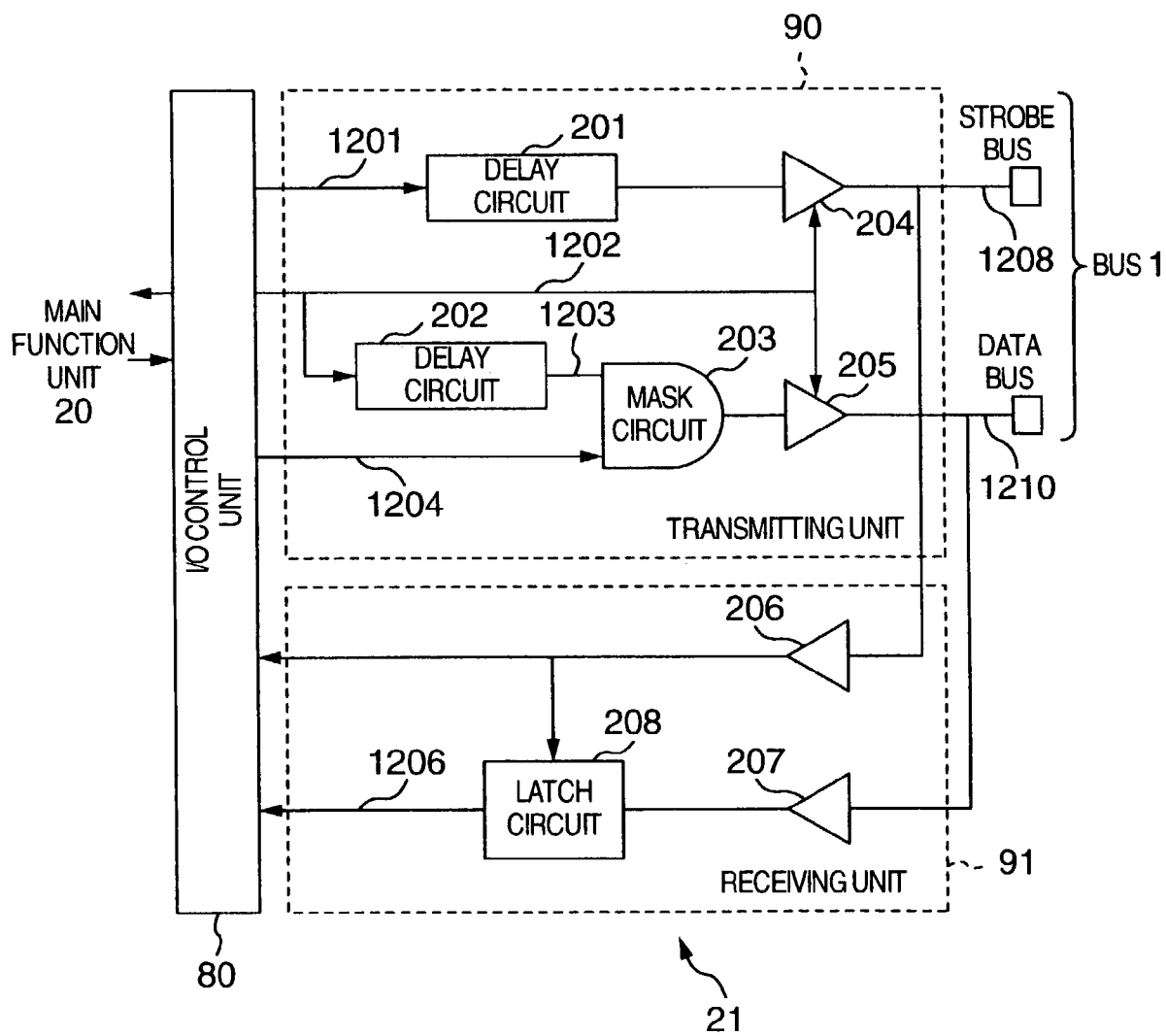
FIG. 4 is a block diagram schematically showing an arrangement of the transceiver unit 21 used in the second embodiment of the invention.

FIG. 4 shows an arrangement of the transceiver unit 21 included in each module 2 of this embodiment.

With reference to FIG. 4, the transceiver 21 includes an I/O control unit 80, a transmitting unit 90, and a receiving unit 91. The transmitting unit 90 includes three-state transmitting circuits 204 and 205, a mask circuit 203 and delaying circuits 201 and 202. The receiving unit 91 includes receiving circuits 206 and 207 and a latch circuit 208. For clarifying the description, therein, the data bus 1210 is shown to have a one-bit width. It is to be understood that the data bus 1210 may be composed of parallel bits. The arrangement for performing a process about the command bus is substantially same as that of the first embodiment and thus is left out in the drawings.

Figure 5:
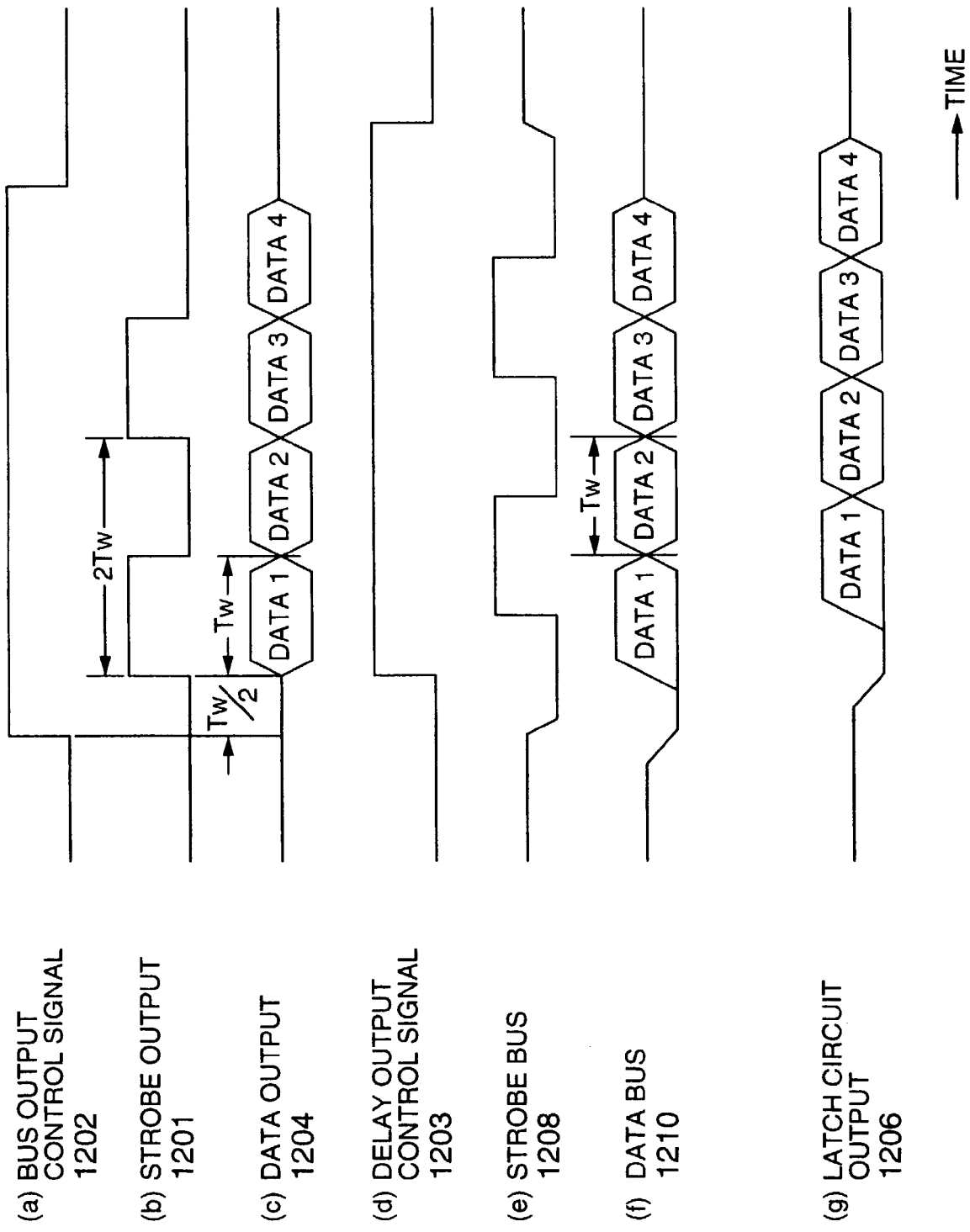
FIG. 5 is a chart showing each timing of signals to be transmitted or received by the transceiver unit 21 shown in FIG. 4.

Hereafter, like the first embodiment, the operation of the transceiver unit 21 will be described with an example of the case that a write command and the data to be written by the write command are transferred from one module 2 to another module 2. The timing chart of the signal to be received and transmitted by the transceiver unit 21 is shown in FIG. 5.

At first, the operation of the transceiver 21 included in the module 2 on the transmitting side will be described below.

The description will be expanded on an assumption that the period when one data piece is transferred on the data bus 1210 has a length of Tw. As shown in FIG. 5, if the data is transmitted from the main function unit 20 to the bus 1, the I/O control unit 80 is served to assert the bus output control signal 1202 to the "H" level (see FIG. 5(a)) and then, after the time Tw/2 is passed, sequentially output the data 1204 at the period Tw (see FIG. 5(c)). In parallel, at the period of 2Tw, the strobe 1201 at a duty ratio of 1:1 is outputted until the output of the last data piece 1204 is terminated (see FIG. 5(b)). At a time when the output of the last data piece 1204 is terminated, the bus output control signal 1201 is returned to the "L" level.

In the transmitting unit 90, when the bus output control signal 1202 is asserted to the "H" level, the three-state transmitting circuit 204 enters into the output state. Then, the strobe signal 1201 delayed by a time Tw/2 by the delaying circuit 201 is outputted onto the strobe bus 1208 of the bus 1 (see FIG. 5(e)).

When the bus output control signal 1202 is asserted to the "H" level, the three-state transmitting circuit 205 enters into the output state as well. Then, until the time Tw/2 is passed, the mask circuit 203 is served to output the "L" level signal because the output control signal 1203 delayed by the time of Tw2 by the delaying circuit 202 is at the "L" level. Next, this "L" level signal is outputted from the three-state transmitting circuit 205 to the data bus 1210 of the bus 1 (see FIG. 5(f)). After the three-state transmitting circuit 205 enters into the output state and then the time of Tw2 is passed, the output control signal 1203 delayed by a time of Tw2 by the delaying circuit 202 is made to be at the "H" level. Thus, the mask circuit 203 is served to output the data pieces 1204 being sequentially inputted as they are. These data pieces 1204 are sequentially outputted onto the data bus 1210 of the bus 1 through the three-state transmitting circuit 205.

When the output of all the data pieces 1204 (four in this example shown in FIG. 5) is terminated, the bus output control signal 1202 returns to the "L" level. This allows the three-state transmitting circuits 204 and 205 to return their states to the high-impedance state.

As a result, after the "L" level signal is being outputted only during the time of Tw2, the essential data is sequentially outputted onto the data bus 1210 of the bus 1 at the period Tw. That is, on the time series, the data sequence the head of which contains the "L" level preamble is outputted onto the data bus 1210. Likewise, the strobe signal 1210, which has a duty ratio of 1:1 whose state is changed into the "H" level after the "L" level signal is outputted only during the time of Tw, is outputted onto the strobe bus 1208 of the bus 1 during a period of 2Tw. That is, the strobe signal 1201 for switching the "H" level into the "L" level or vice versa according to the data period is outputted onto the strobe bus 1208.

Next, the operation of the transceiver unit 21 included in the module 2 on the receiving side will be described below.

The strobe signal received from the strobe bus 1208 of the bus 1 by the receiving circuit 206 is inputted into the I/O control unit 80 and the latch circuit 208. The data received from the data bus 1210 of the bus 1 by the receiving circuit 207 is inputted into the latch circuit 208. The latch circuit 208 is served to latch the data to be inputted from the receiving circuit 207 at the rise and the fall, that is, at the switching points of both the "H" level and the "L" level of the strobe signal received from the receiving circuit 206 and then the latched data 1206 is passed into the I/O control unit 80 (see FIG. 5(g)).

The I/O control unit 80 is served to read the data received from the latch circuit 208 by using the strobe signal received from the receiving circuit 206 and then pass the data to the main function unit 20.

In this embodiment, like the first embodiment, as shown in FIG. 5, the pulse width of the output data is shortened by increasing a delay time of the receiving circuit 207 resulting from a transition time taking place about the first received data piece. This shortened pulse width is brought about with respect to the preamble. It means that no shortening of the pulse width takes place with respect to the essential data. Hence, the data transfer period may be reduced accordingly and thereby makes the data transfer more efficient.

The present embodiment has been expanded on a assumption that the receiving side may latch the data in synchronous to both the rise and the fall of the strobe signal. This embodiment holds true to a case that the receiving side takes the data in synchronous to either one of the rise and the fall of the strobe signal by reducing the period of the strobe signal into Tw/2.

Further, in this embodiment, the transmitting side has been arranged to delay the strobe signal by the time of Tw/2 relative to the data. Alternatively, the transmitting side may be arranged to take the data in synchronous to the strobe signal delayed by the time of Tw/2 by the receiving side without delaying the strobe signal by the transmitting side itself.

In turn, the description will be oriented to the third embodiment of the present invention. This embodiment is the same as the first embodiment except the arrangement of the transceiver unit 21.

Figure 6:
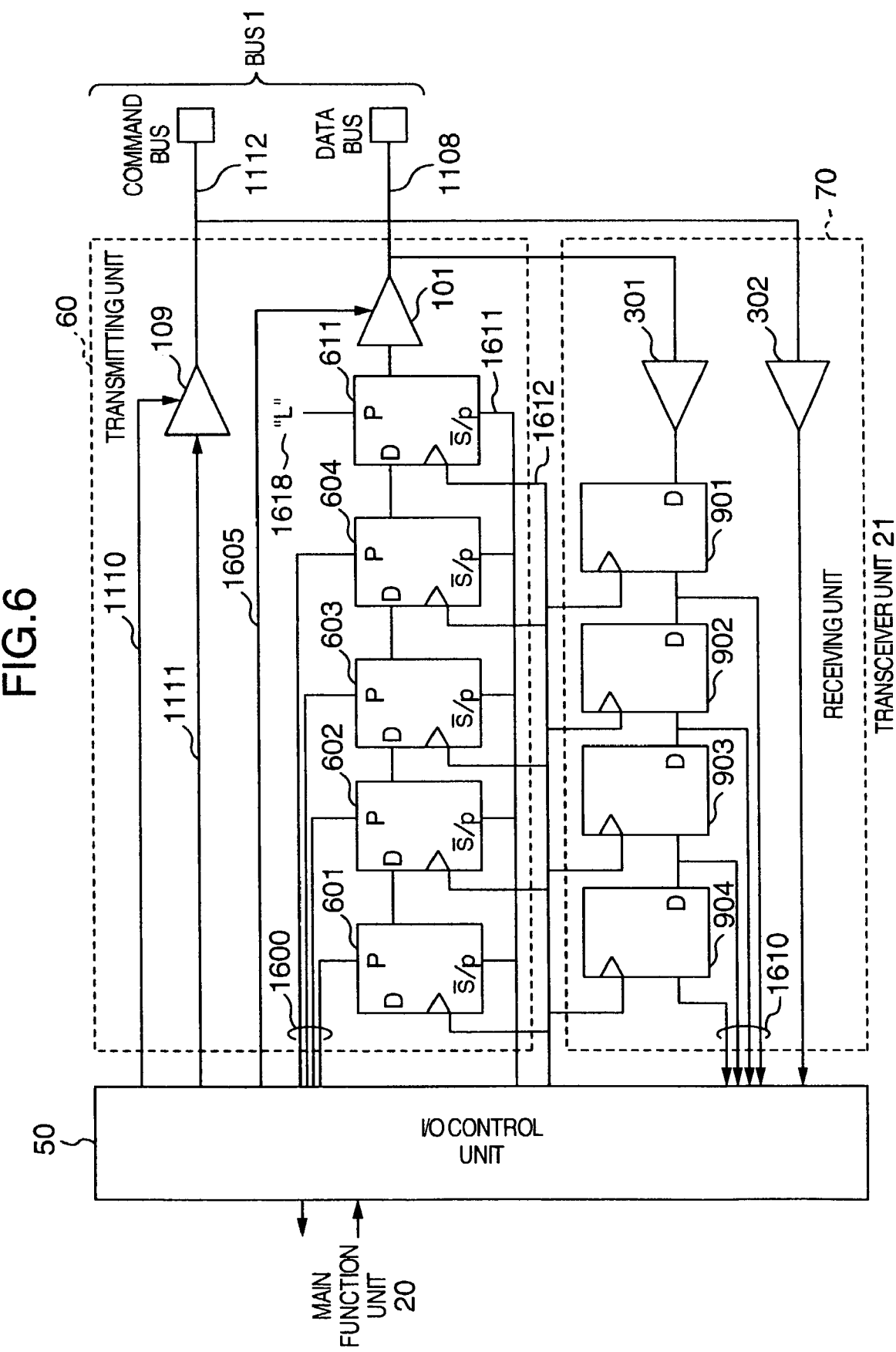
FIG. 6 is a block diagram schematically showing an arrangement of the transceiver unit 21 used in the third embodiment of the invention.

FIG. 6 shows an arrangement of the transceiver unit 21 according to this embodiment.

As shown in FIG. 6, the transceiver unit 21 includes an I/O control unit 50, a transmitting unit 60, and a receiving unit 70. The transmitting unit 60 includes three-state transmitting circuits 101, 109 and D flip-flops with preset function 601 to 604 and 611. These D flip-flops with preset function 601 to 604 and 611 are served to hold the data from a data input terminal D as well as set any data pieces from preset terminals P. Further, those D flip-flops 601 to 604 and 611 are also served to shift the data pieces held from parallel/serial control terminals, that is, S/P terminals in synchronous to a clock to be inputted at clock terminals. The receiving unit 70 includes receiving circuits 301 and 302 and D flip-flops 901 to 904.

Like the first embodiment, hereafter, the operation of the transceiver 21 will be described with an example of the case of transferring a write command the data to be written by the write command from one module 2 to another module 2. This description will be expanded with reference to the timing chart of FIG. 7.

If a request for data transmission takes place from the main function unit 20, the I/O control unit 50 executes the cycles for outputting a command 1111 (see FIG. 7(c)) and for asserting a command output control signal 1110 (see FIG. (b)) and then outputs a parallel/serial control signal 1611 (see FIG. 7(f)). In parallel, the I/O control unit 50 executes a cycle for outputting the data 1600 having a four-bit width to the P terminals of the flip-flops 601 to 604 in parallel (see FIG. 7(f)). In addition, during the cycle for outputting the data 1600 and the later four cycles, that is, the totally five cycles, the bus output control signal 1605 is at the "H" level (see FIG. 7(g)).

Figure 7:
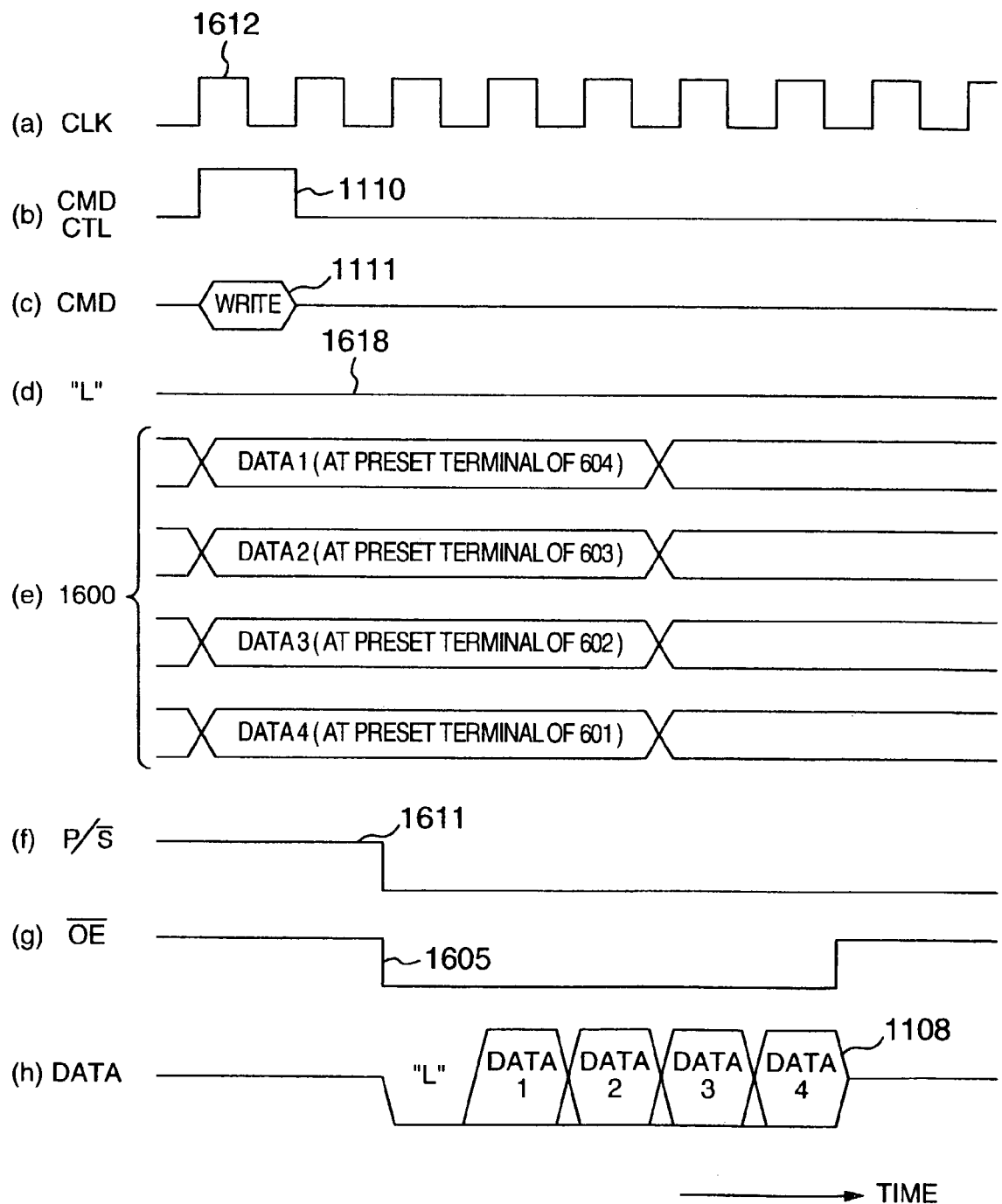
FIG. 7 is a chart showing each timing of signals to be received and transmitted by the transceiver unit 21 shown in FIG. 6.

In the transmitting unit 60, when the parallel/serial control signal 1611 is outputted, the fixed data 1618 (see FIG. 7(d)) is set to the D flip-flop with preset function 611, while the four-bit data 1600 is set to the D flip-flops 601 to 604 each of which has the preset function. After this type of preset cycle, the data set to the D flip-flops with preset function 601 to 604 are synchronous to the clock signal 1612 (see FIG. 7(*a*)) for specifying the cycles so that each of the D flip-flops with preset function 602 to 604 and 611 may be inputted with the data piece at the input terminal D. This operation makes the data to be sequentially shifted toward the D flip-flop with preset function 611. Finally, the data is inputted into the three-state transmitting circuit 101. Then, during this period, the data is outputted from the three-state transmitting circuit 101 that is held in the data output state by means of the output control signal 1605 onto the data bus 1108 of the bus 1 (see FIG. 7(*h*)).

Next, the description will be oriented to the operation of the transceiver unit 21 included in the module 2 on the receiving side.

The command received from the command bus 1112 of the bus 1 by the receiving circuit 302 is transmitted to the I/O control unit 50. On the other hand, the data received from the data bus 1108 of the bus by the receiving circuit 301 is stored in the D flip-flop 901. Then, the data is sequentially shifted to the D flop-flops 902 to 904 in synchronous to the clock signal 1612. In the cycle later than the cycle for receiving the command by six cycles, the I/O control unit 50 is served to read out the four-bit data from the D flip-flops 901 to 904 in parallel and transmit the data as valid data 1610 to the main function unit 20. This operation results in making it possible to pass only the essential data from which the preamble is excluded.

This embodiment may offer a similar effect to the foregoing first embodiment.

Figure 8:
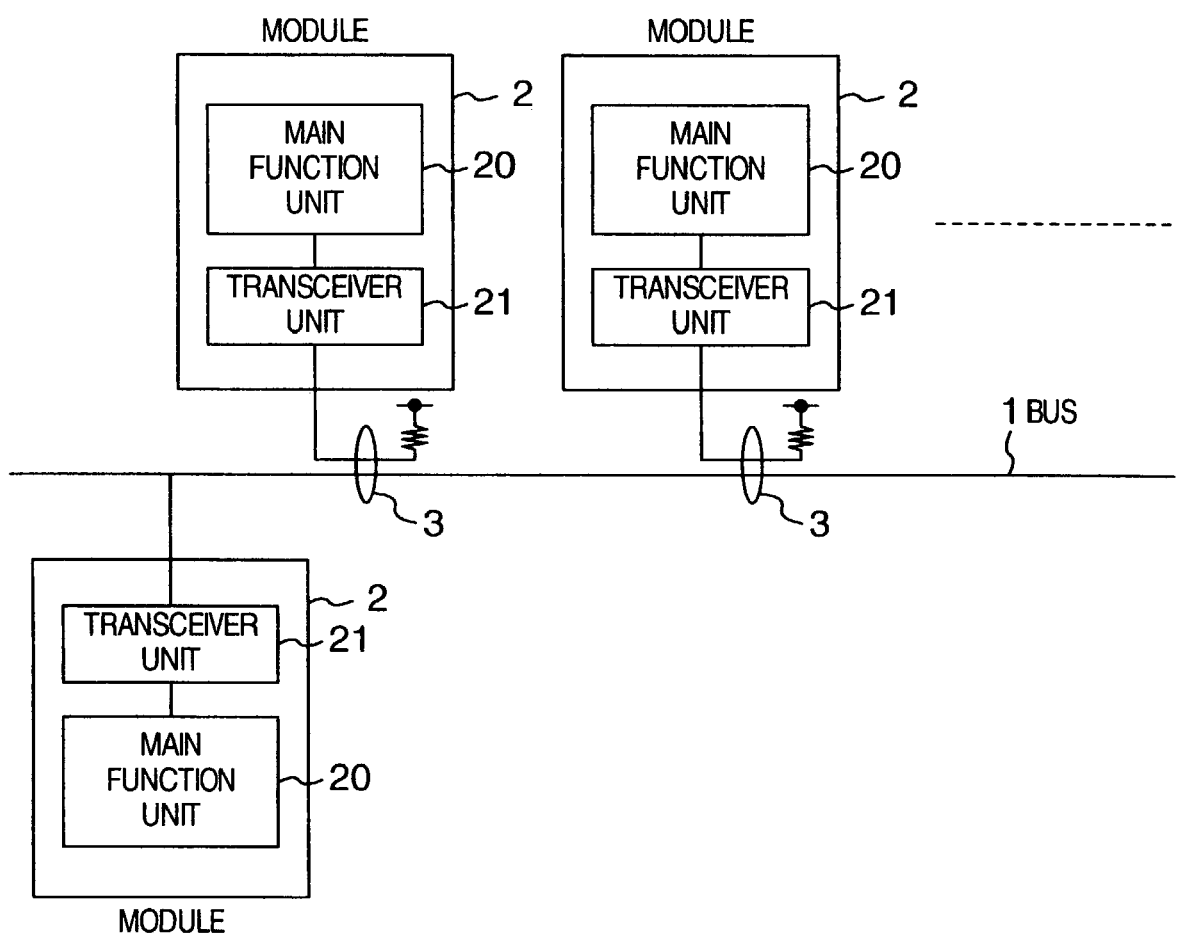
FIG. 8 is a block diagram schematically showing an arrangement of a bus system to which the fourth embodiment of the invention is applied.

FIG. 8 shows a schematic arrangement of a bus system to which the fourth embodiment of the invention is applied.

As shown in FIG. 8, in the foregoing first embodiment, the bus system of this embodiment is arranged to directly connect at least one module 2 to the bus 1 and the other module 2 to the bus 1 through a directional coupler 3 in a noncontact manner, As mentioned above, herein, the arrangement including the bus 1 and the directional coupler 3 is called a noncontact bus.

Figure 9:
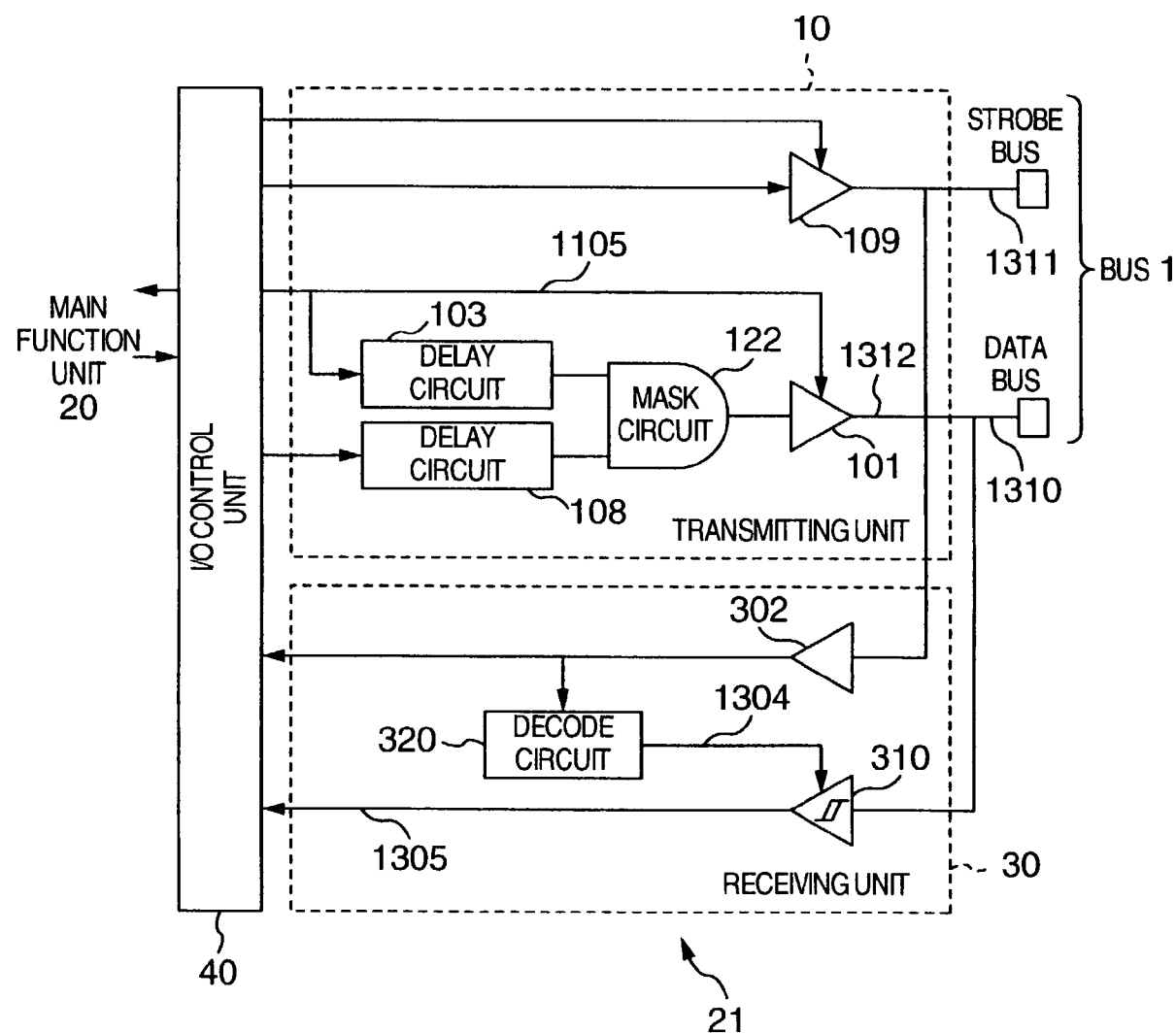
FIG. 9 is a block diagram schematically showing an arrangement of the transceiver unit 21 used in the fourth embodiment of the invention.

FIG. 9 shows a schematic arrangement of the transceiver unit 21.

As shown in FIG. 9, the transceiver unit 21 is arranged as similarly as the transceiver unit 21 of the first embodiment, except that receiving circuit with reset function and hysteresis characteristic 310 is used as a circuit for receiving the data in place of the receiving circuit 301 and a decode circuit 320 is provided for resetting the receiving circuit with hysteresis characteristic with hysteresis characteristic 310.

Hereafter, like the foregoing first embodiment, the operation of the transceiver unit 21 will be described with an example of the case of transferring a write command and the data to be written by the write command from one module 2 to another module 2. The timing chart of the signals to be received and transmitted by the transceiver unit 21 is illustrated in FIG. 10.

The operation of the transceiver unit 21 is similar to the foregoing first embodiment except that the decode circuit 320 resets the receiving circuit with hysteresis characteristic 310.

Figure 10:
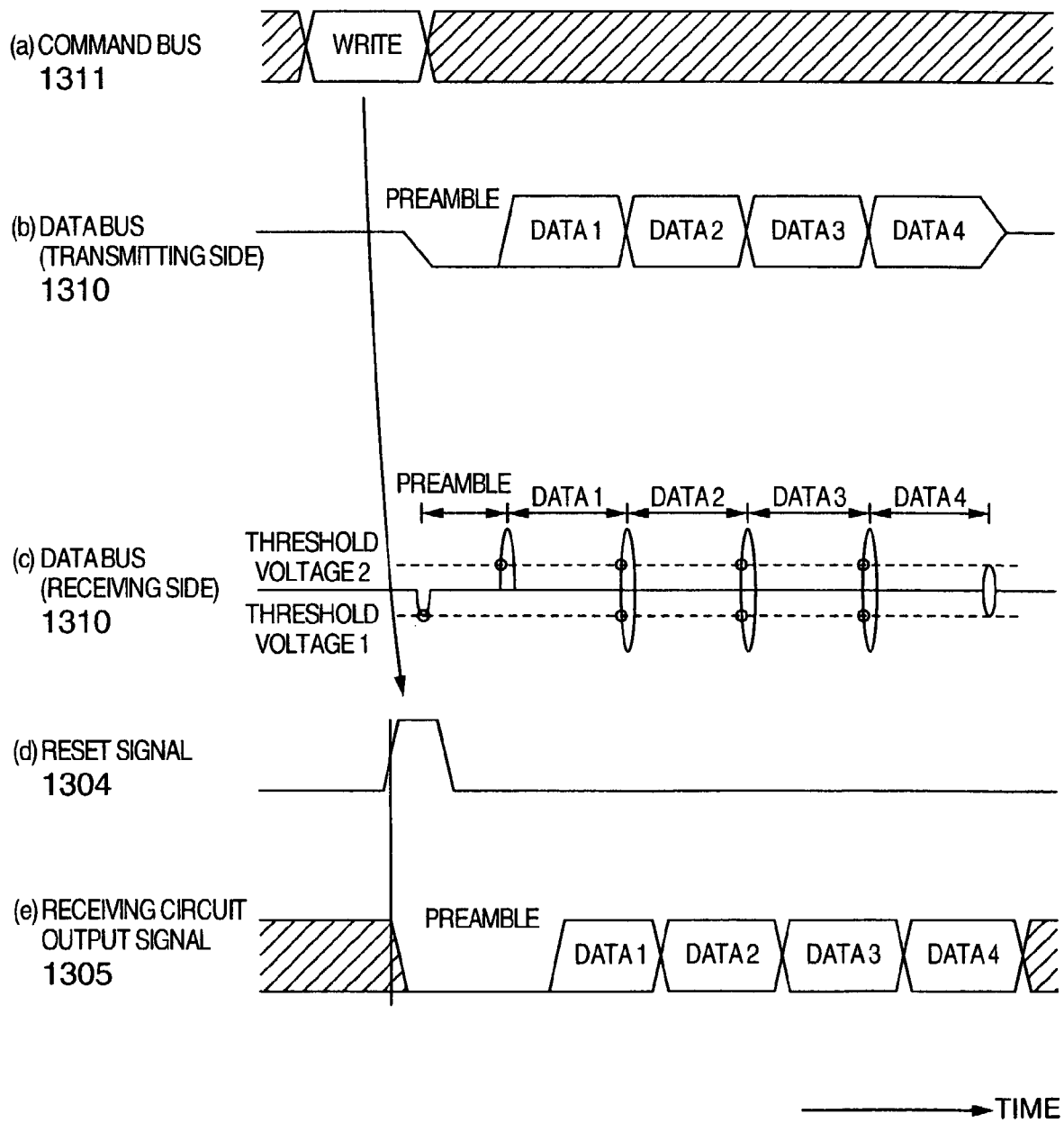
FIG. 10 is a chart showing each timing of signals to be received or transmitted by the transceiver unit 21 shown in FIG. 9.

That is, in the transceiver unit 21 included in the module 2 on the transmitting side, the transmitting unit 10 operates to transmit a preamble onto the data bus 1310 of the bus 1 in the cycle immediately after the cycle (see FIG. 10(*a*)) in which the command is transmitted to the command bus 1311 of the bus. Then, in the next cycle, the data is transmitted onto the data bus 1310 (see FIG. 10(*b*)).

The data containing the preamble outputted to the data bus 1310 is passed to the transceiver unit 21 of the module 2 on the receiving side through the directional coupler 3. On the data bus 1310 connected to the transceiver unit 21 of the module on the receiving side, as the data containing the preamble, as shown in FIG. 10(*c*), a relatively small differential pulse that indicates the start point of the preamble, a relatively large differential pulse that indicates the start point of the first data piece having a different value from the preamble located immediately before the first data piece, and a relatively large differential pulse that indicates the start point of the second or later data piece having a different value from the data located immediately before are sequentially transmitted.

That is, if the value of the first data piece is equal to the value of the preamble, no differential pulse takes place. In this embodiment, hence, if the first data piece has the same value as the preamble located immediately before the first data piece, the receiving circuit with hysteresis characteristic 310 is served to output the same value as the just previous preamble if no differential pulse takes place.

Concretely, during the preamble period, the receiving circuit with hysteresis characteristic 310 is reset by the decode circuit 320 so that the same value as the preamble may be set to the receiving circuit with hysteresis characteristic 310. That is, if the command 1311 is received by the receiving circuit 302, the decode circuit 320 detects the command 1311 and then output the reset signal 1304 (see FIG. 10(*d*)). This causes the receiving circuit with hysteresis characteristic 310 to be reset so that the same value as the preamble, that is, the "L" level value may be held in the receiving circuit with hysteresis characteristic 310.

This makes it possible for the receiving circuit with hysteresis characteristic 310 to correctly output the data. That is, if the first data piece is at the "L" level, no differential pulse takes place. Hence, the data with the set "L" level is outputted as it is. If the first data piece is at the "H" level, the "H" level data may be outputted according to the relatively large differential pulse caused thereby (see FIG. 10(*e*)).

Figure 11:
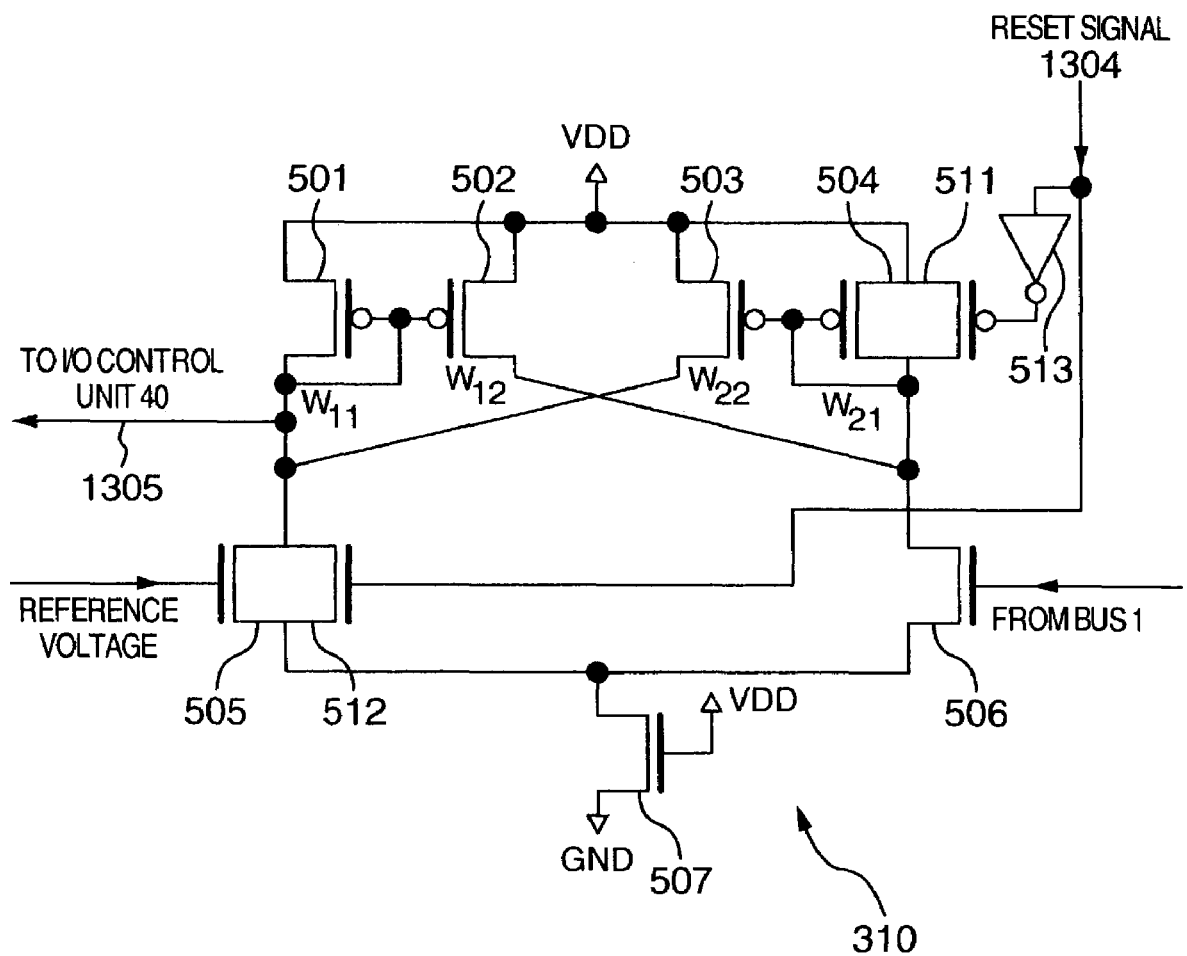
FIG. 11 is a diagram schematically showing an arrangement of a receiving circuit with hysteresis characteristic 310 used in the fourth embodiment of the invention.

The arrangement of the resettable receiving circuit with hysteresis characteristic 310 is shown in FIG. 11.

In FIG. 11, p-channel MOS transistors 501-504 and n-channel MOS transistors 505 to 507 compose a current mirror circuit. This circuit has a hysteresis characteristic for switching the output data according to the received differential pulse.

For the purpose of resetting such a circuit, this embodiment provides a p-channel MOS transistor 511, an n-channel MOS transistor 512 and an inverting circuit 513.

If the reset signal 1304 is at the "H" level, the p-channel MOS transistor 511 and the n-channel MOS transistor 512 are kept on and the n-channel MOS transistor 506 is transited to the same state as the case that it receives the differential pulse corresponding to the data change from the "H" level to the "L" level. Afterwards, even if the reset signal 1304 is returned to the "L" level, unless the n-channel MOS transistor 506 receives the corresponding differential pulse to the data change from the "L" level to the "H" level, the output signal 1305 of the receiving circuit is kept at the level appearing when the circuit is reset.

By the way, the relatively small differential pulse caused at the start point of the preamble may have an adverse effect of the subsequent operation of the receiving circuit with hysteresis characteristic 310 arranged by using the current mirror circuit shown in FIG. 11. Hence, the reset operation should be done during the period when the relatively small differential pulse caused at the start point of the preamble is masked (or removed) or after the differential pulse is generated before generating the differential pulse for the first data piece. For this purpose, like this embodiment, it is preferable to generate the reset signal from the command signal.

According to this embodiment, the receiving circuit with hysteresis characteristic 310 is just required to treat the relatively large differential pulse corresponding to the relatively large change from the "L" level to the "H" level or from the "H" level to the "L" level. Hence, this receiving circuit with hysteresis characteristic 310 may secure a large noise margin and shorten the data transfer period accordingly, thereby making it possible to efficiently transfer the data as compared with the receiving circuit with hysteresis characteristic 310 arranged to treat a relatively small differential pulse corresponding to a relatively small change from the middle level to the "H" level or the "L" level.

In addition, the foregoing description has been expanded on that the preamble is a signal fixed at the "L" level. Alternatively, it may be a signal fixed at the "H" level. In this case, however, the signal at the "H" level is held in the receiving circuit with hysteresis characteristic 310 by the reset operation.

Further, this embodiment has been described with an example of the case of transferring the write command and the data to be written by the write command from one module 2 to another module 2. However, this embodiment may apply to the case that the command issuer is the data transfer destination, that is, the case that a read command is issued from one module 2 to another module 2 and the data is transferred from the latter module 2 to the former module 2. In this case, the I/O control unit 40 included in the module 2 on the receiving side is served to transmit the data in the cycle two later than the cycle in which the module 2 issued the command as the valid data to the main function unit 20. Further, the decode circuit 320 detects the issuance of the command from the module 2 and resets the receiving circuit with hysteresis characteristic 310.

Like the foregoing second embodiment, the present embodiment may apply to the transfer of the data through the use of the strobe signal.

The foregoing description has been concerned with each embodiment of the present invention.

The present invention is not limited to the foregoing embodiments but may be transformed in several forms without departing from the spirit of the invention.

For example, the foregoing embodiments have been described with an example of the case in which the present invention is applied to the transfer of data. The data transfer with the preamble implemented in the present invention may apply to the transfer of any information such as a command or an address. Further, it may apply to not only the data transfer on the bus but the data transfer between two modules connected in a one-to-one manner. Moreover, the bus system indicated in each embodiment may apply to the address bus or the bus containing the control signal lines.

Figure 12:
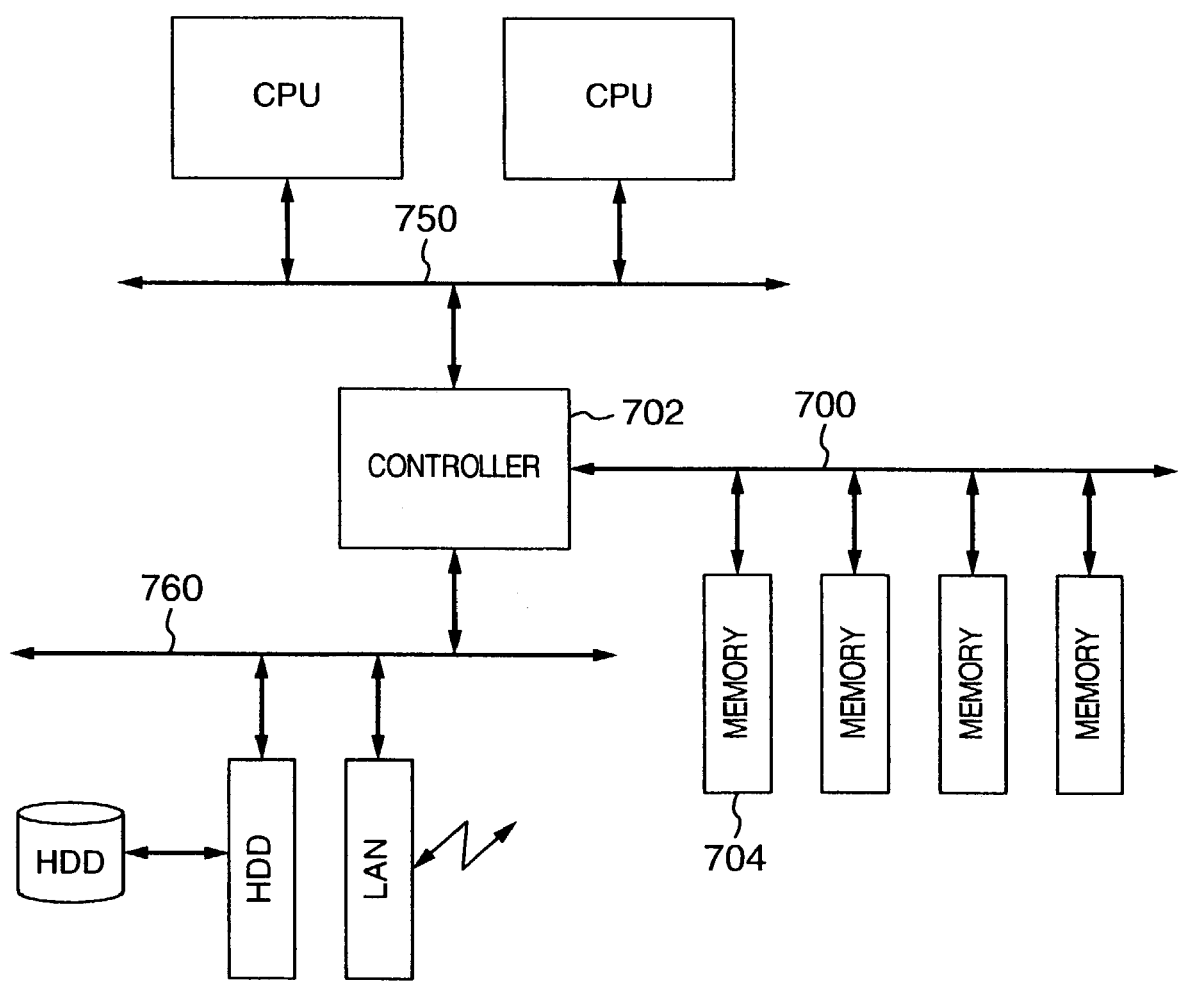
FIG. 12 is a block diagram showing a computer to which each embodiment of the invention may be applied.

The bus system indicated in each embodiment may apply to the computer as shown in FIG. 12, for example.

In the computer, the CPU and a controller 702 are connected through a processor bus 750. I/O devices such as a harddisk and a network device may be connected to the controller 702 through an I/O bus 760. The memory chip 704 and the controller 702 are connected by a memory bus 700.

Assuming that in such a computer the controller 702 and the memory chip 704 correspond to the module 2 indicated in the foregoing each embodiment and the memory bus 700 corresponds to the bus 1 indicated in the foregoing each embodiment, the present invention is effective in speeding up the memory bus 700 and improving the performance of the computer. Likewise, assuming that the processor bus 750 and the I/O bus 760 correspond to the bus 1 in the foregoing each embodiment and the CPU, the controller 702 and the I/O devices correspond to the module 2 indicated in the foregoing each embodiment, the present invention is effective in speeding up the processor bus 750 and the I/O bus 760 and improving the performance of the computer.

Figure 13:
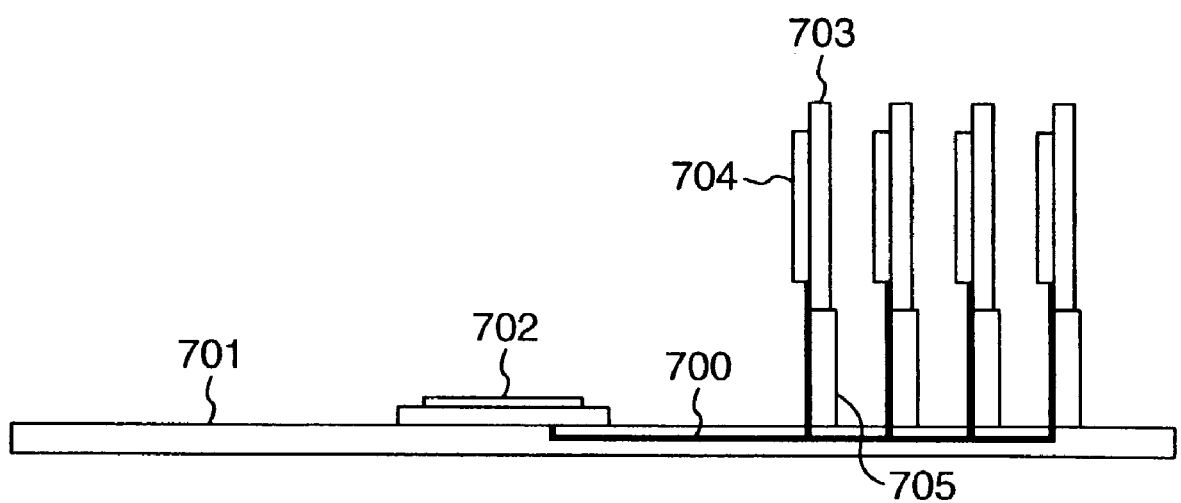
FIG. 13 is an explanatory view showing the location of each component of the computer shown in FIG. 12.
Figure 14:
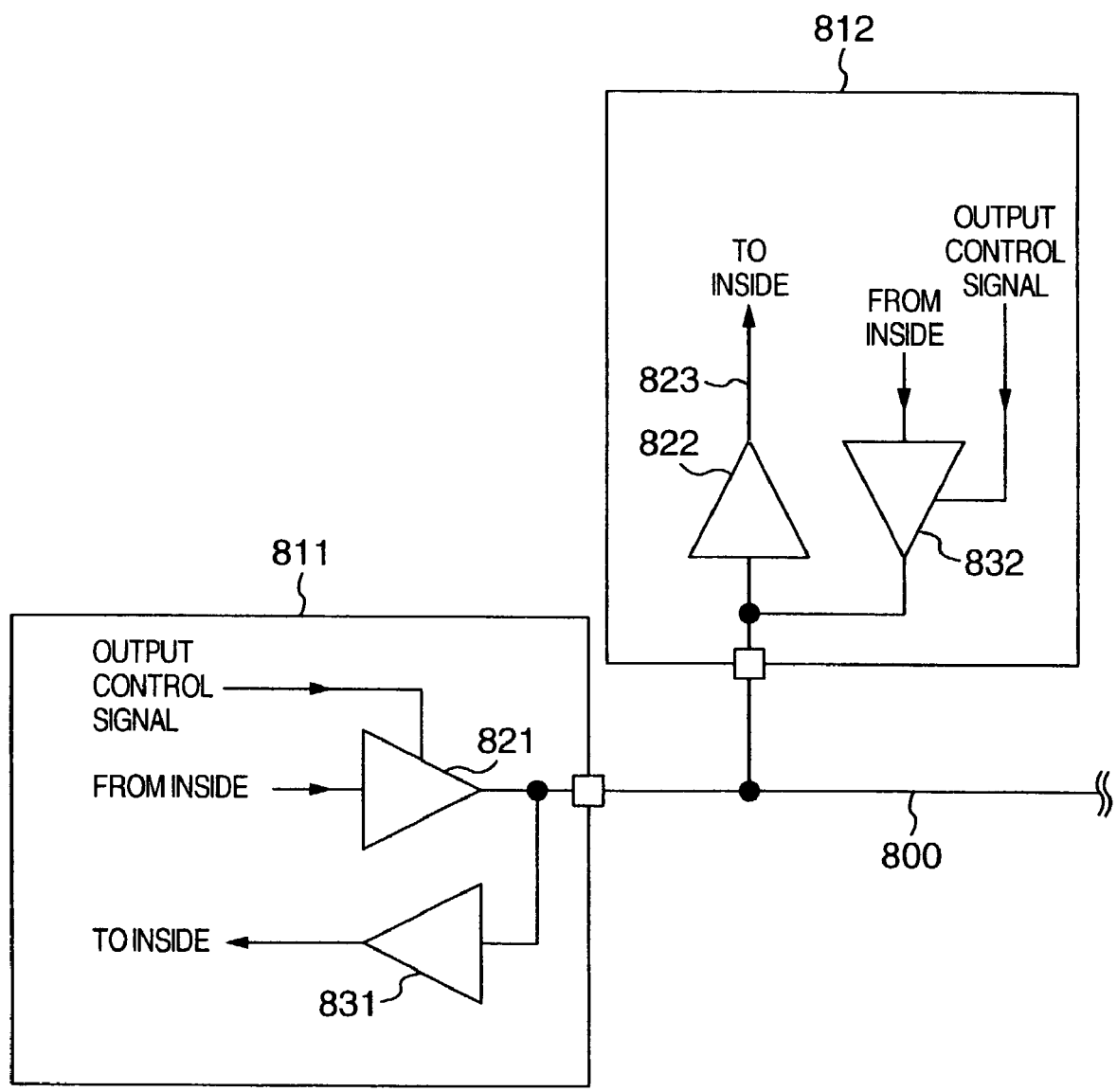
FIG. 14 is a block diagram showing an arrangement of a typical bus system.
Figure 15:
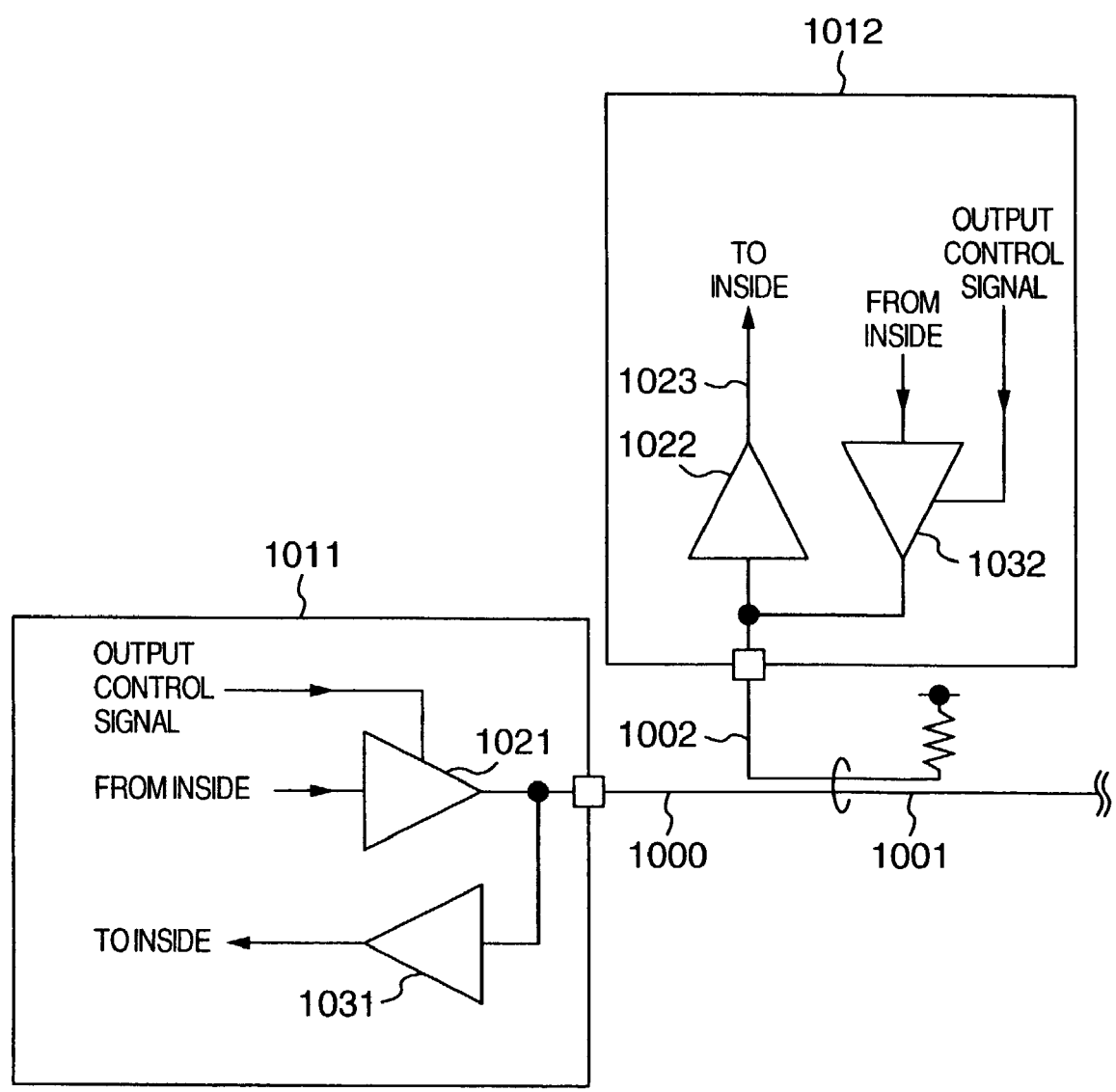
FIG. 15 is a block diagram showing an arrangement of a typical noncontact bus system.
Figure 16:
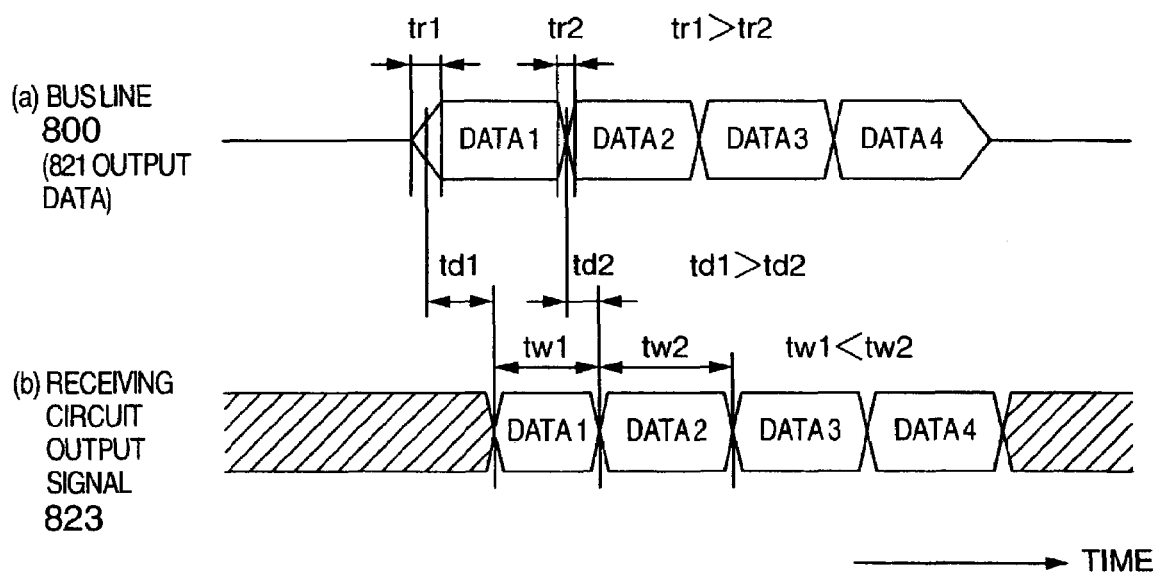
FIG. 16 is a chart showing each timing of signals to be received or transmitted by the bus system shown in FIG. 14.
Figure 17:
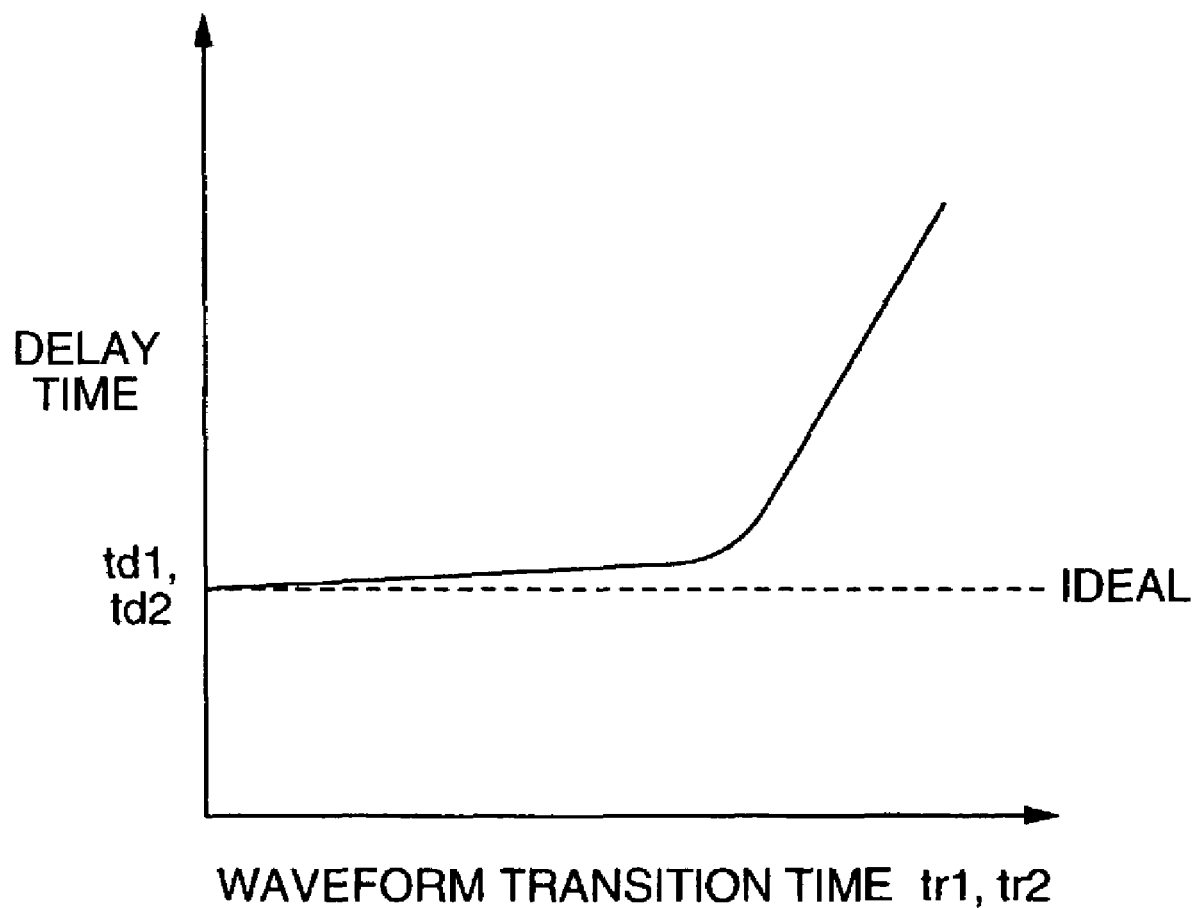
FIG. 17 is a chart showing a delay characteristic of the receiving circuit shown in FIG. 14.
Figure 18:
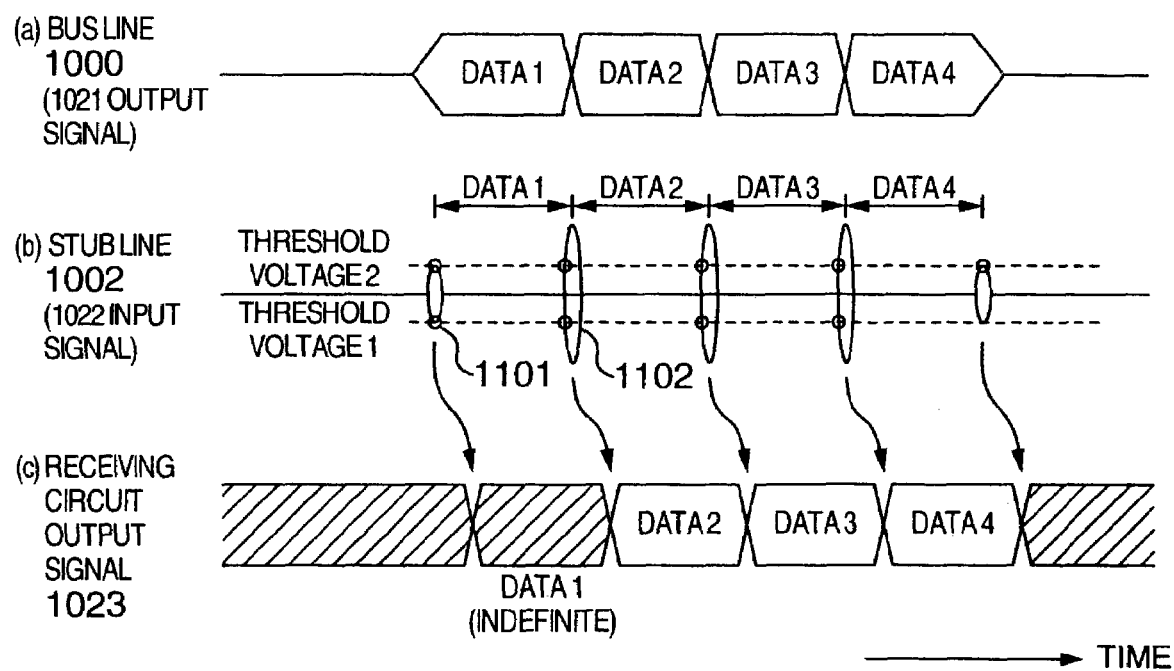
FIG. 18 is a chart showing each timing of signals to be received or transmitted by the bus system shown in FIG. 15.

In addition, each component in the computer may be located as shown in FIG. 13, for example.

In FIG. 13, numeral 701 denotes a main substrate on which an integrated circuit such as a CPU is mounted. Numeral 702 denotes a memory controller that is an integrated circuit for controlling the CPU, the memory and the I/O devices. Numeral 703 denotes a memory module on which a memory chip 704 is mounted. The memory module 703 is connected to the main substrate 701 through a socket 705. The memory chip 704 and the controller 702 are connected through a memory bus 700.

The invention claimed is:

1. A data transmitter for transmitting a plurality of data pieces in sequence, said data transmitter comprising:
   transmitting means for selectively switching an output state into one of a high-impedance state and a data output state whose level is determined; and
   output control means for enabling said transmitting means to transmit said plurality of data pieces in sequence by sequentially inputting said plurality of data pieces to said transmitting means, after an output state of said transmitting means is switched from the high-impedances state to the data output state and thereafter a predetermined length of time is passed,
   wherein said output control means enables said transmitting means to transmit a preamble by inputting said preamble that is dummy data with a predetermined level until said predetermined length of time is passed, after the output of said transmitting means is switched from the high-impedance state to the data output state, and
   wherein said output control means comprises:
   transfer data output means for outputting said plurality of data pieces to be entered into said transmitting means in parallel after the output state of said transmitting means is switched from the high-impedance state to the data output state;
   adding means for adding said preamble to a combination of said data pieces having been outputted by said transfer data output means in parallel; and
   parallel/serial converter means for storing said plurality of data piece having said preamble added by said adding means and, after the output of said transmitting means is switched from the high-impedance state to the data output state, serially outputting said plurality of stored data pieces as holding said preamble at a head of said data pieces.

2. A data transfer system having a data transmitter for sequentially transmitting a plurality of data pieces and a data receiver for receiving said data pieces transmitted by said data transmitter, said data transfer system comprising:
   said data transmitter which comprises;
   transmitting means for selectively switching an output state into one of a high-impedances state and a data output state whose level is determined, and
   output control means for sequentially transmitting said plurality of data pieces from said transmitting means by sequentially inputting said plurality of data pieces into said transmitting means, after the output state of said transmitting means is switched from the high-impedance state into the data output state and thereafter a predetermined length of time is passed,
   said output control means being served to transmit a preamble from said transmitting means by inputting said preamble that is dummy data with a given level until said predetermined length of time is passed, after the output state of said transmitting means is switched from the high-impedance state into the dummy output state;

said data receiver which comprises;

receiving means with hysteresis characteristic for detecting a positive or negative pulse for indicating a change of a polarity of the data received by said data transmitter, setting one of a positive value and a negative value to its inside according to a polarity of said detected pulse, and outputting said set value as a value of the data received by said data transmitter, and reset means for detecting a start of data receipt and resetting said receiving means with hysteresis characteristic to have the same level as said preamble, wherein said output control means comprises:

transfer data output means for outputting said plurality of data pieces to be inputted into said transmitting means in parallel, after the output state of said transmitting means is switched from the high-impedance state into the data output state;

adding means for adding said preamble into a combination of said data pieces outputted by said transfer data output means in parallel; and parallel/serial convertor means for storing said plurality of data piece having said preamble added by said adding means and, after the output state of said transmitting means is switched from the high-impedance state into the data output state, serially outputting said plurality of stored data pieces as holding said preamble at a head of said data pieces.

3. A data transfer method, provided in a data transfer system having a transmitting module and a receiving module, both of which are coupled through a noncontact bus utilizing a crosstalk, the method comprising the steps of:

in said transmitting module, after the state of said noncontact bus is changed into the high-impedance state, transmitting a data sequence having a level-determined valid data at the head of a plurality of data pieces onto said noncontact bus and generating a differential pulse corresponding to said data sequence on said noncontact bus; and in said receiving module, removing an influence of the differential pulse corresponding to said invalid data of said data sequence from the differential pulses on said noncontact bus and reproducing said plurality of data pieces from the corresponding differential pulses to said plurality of data pieces, transmitting a command related with said plurality of data pieces from said transmitting module;

in said receiving module, receiving said command and generating a pulse signal based on said command; and in said receiving module, removing an influence of the differential pulse corresponding to said invalid data on the basis of said pulse signal, and wherein reproduction of said plurality of data pieces is executed by a receiving circuit with a hysteresis characteristic.

4. A data transfer method as claimed in claim 3, in which said receiving circuit with the hysteresis characteristic has a reset function, and further comprising the steps of:

resetting said receiving circuit with the hysteresis characteristic in response to said pulse signal; and removing the influence of the differential pulse corresponding to said invalid pulse by outputting the output pulse having a same level value as that of said invalid pulse.

* * * * *